F. PETERSEN.
CORN-PLANTER.
No. 187,044. Patented Feb. 6, 1877.
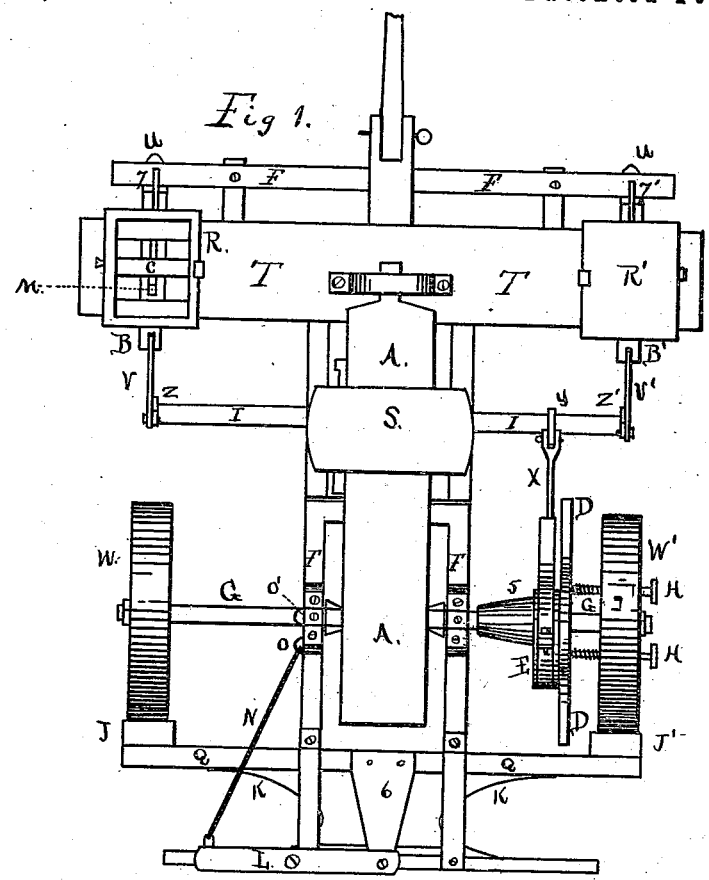
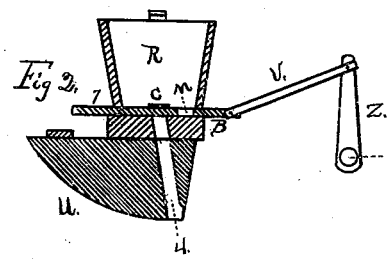
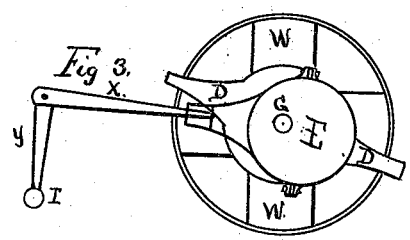

UNITED STATES PATENT OFFICE.

FRED PETERSEN, OF GRAND RAPIDS, MICHIGAN.

IMPROVEMENT IN CORN-PLANTERS.

Specification forming part of Letters Patent No. 187,044, dated February 6, 1877; application filed December 8, 1876.

*To all whom it may concern:*

Be it known that I, FRED PETERSEN, of the city of Grand Rapids, county of Kent, and State of Michigan, have invented certain new and useful Improvements in Corn-Planters, which improvements are fully set forth in the following specification, reference being had to the accompanying drawings.

The object of my invention is to construct an automatic corn-planter having a rocking shaft connected with the cranks for operating grain-slides, and connected with an eccentric on the main axle-tree, by means of which the shaft receives its motion.

The machine is illustrated more in detail in the plane top view, Figure 1, and the vertical sectional views shown in Figs. 2 and 3.

In Fig. 1, F F represent the main framework of the machine, which is supported by the axle-tree G and connecting-beam T T. W W' are wheels rigidly attached to the axle-tree G, with which they revolve. R R' are seed-hoppers. A A is a broad reach, connecting G and T T, and supporting the driver's seat S, which seat S is constructed to slide along on reach A A, so that the pressure on furrowers U U may be adjusted at pleasure by the operator. I I is a rocking shaft, supported by lugs beneath, and attached to frame F F. The seed-hoppers are converging toward the bottom of each hopper, and directly above the opening 4 is a cross-piece, (shown by C in Figs. 1 and 2,) which operates as a cut-off. B B' are two slides, one in each hopper. The slide passes through bottom of hopper and beneath cut-off c, and fits so closely that no seed can escape, as shown fully in Fig. 2. These slides are each provided with a small opening, (shown in Figs. 1 and 2 by M,) which forms the seed-cell and gages the quantity of grain for each dropping, in the following manner: The seed in the hopper fills M. B is then slid along the bottom of the hopper by the operation of crank Z until the seed-cell M is under the cut-off C, and the seed in the hopper is cut off from seed in cell M, and the seed in M is dropped down through the opening 4 to the ground, M passing in the meantime to the other side of C, to be again refilled and again discharged as it is drawn back to the position shown in Figs. 1 and 2. This cell M may be adjusted to any required size by moving the adjusting-slides 7 and 7' in the slots in slides B and B'. The reciprocal motion of the slides B and B' is produced in the following manner: B is connected by rod V to crank Z, which crank Z is rigidly attached to rocking shaft I, and B' is connected to I in a similar manner by V' and Z'. The positions of V and Z are fully shown in Fig. 2. The shaft 1 has a crank, Y, (shown in Figs. 1 and 3,) and is connected by pitman X with eccentric E, as shown in Fig. 3. E is attached to the axle-tree G, so that as G is revolved the rocking motion is given to I and the reciprocating motion to B B', heretofore described. D D are two arms, which act as markers to indicate the distance the hills are apart in the rows. They project a little beyond the outer edge of the wheel W', and revolve with the eccentric, making indentations abreast each hill, so that the situation of the hills can be plainly distinguished, thereby enabling the operator to plant his corn in rows both ways.

The eccentric P and hill-markers D D are loosely placed upon the axle G. On the inner side, and rigidly attached to the axle G, is the shoulder 5. H H are thumb-bolts, which may be screwed up against D D, so as to clasp D D and E between the thumb-bolts and shoulder, which causes the markers D D and eccentric E to revolve with the axle, thereby operating slides B and B'. When the machine is not in use, the thumb-bolts may be loosened, and the machine transported at pleasure, without moving the eccentric, rocking shaft, &c. The main frame projects for a considerable distance back of the wheels, as shown in Fig. 1.

J J' are scrapers attached to sliding frame Q Q, which slides in ways on frame F F. Attached to Q Q is a broad arm, 6, which arm is attached by a movable bolt to lever L, which lever turns upon a bolt in frame F, and is provided with a rod, N, which rod is provided with a hook at its front end, so as to engage with loops o or o'. K K are springs, attached at one end to frame F F, and at the other to sliding frame Q Q, and press the scrapers J J' against the wheels. When N is hooked into loop o' the scrapers are withdrawn from the wheels W W', the position they occupy when the machine is not in use.

Having thus described my invention, what

I claim to have invented, and desire to secure by Letters Patent, is—

1. The combination of the eccentric E, loosely mounted on the main axle G, the marker D D, connected with said eccentric, and the supporting-wheel W', these members being constructed and operating substantially as set forth, whereby the eccentric E and markers D D may simultaneously be thrown into or out of operation by devices connecting them with the wheel, to stop or start the movements of the seed-slides and marker.

2. The combination of the seed-slide B, operating eccentric E, loosely mounted on the main axle G, the supporting-wheel W', and the thumb-bolts H H, for connecting and disconnecting the wheel and eccentric, substantially as shown.

FRED PETERSEN.

Witnesses:
CHARLES A. RENWICK,
EDWARD TAGGART.